United States Patent Office 3,016,101
Patented Jan. 9, 1962

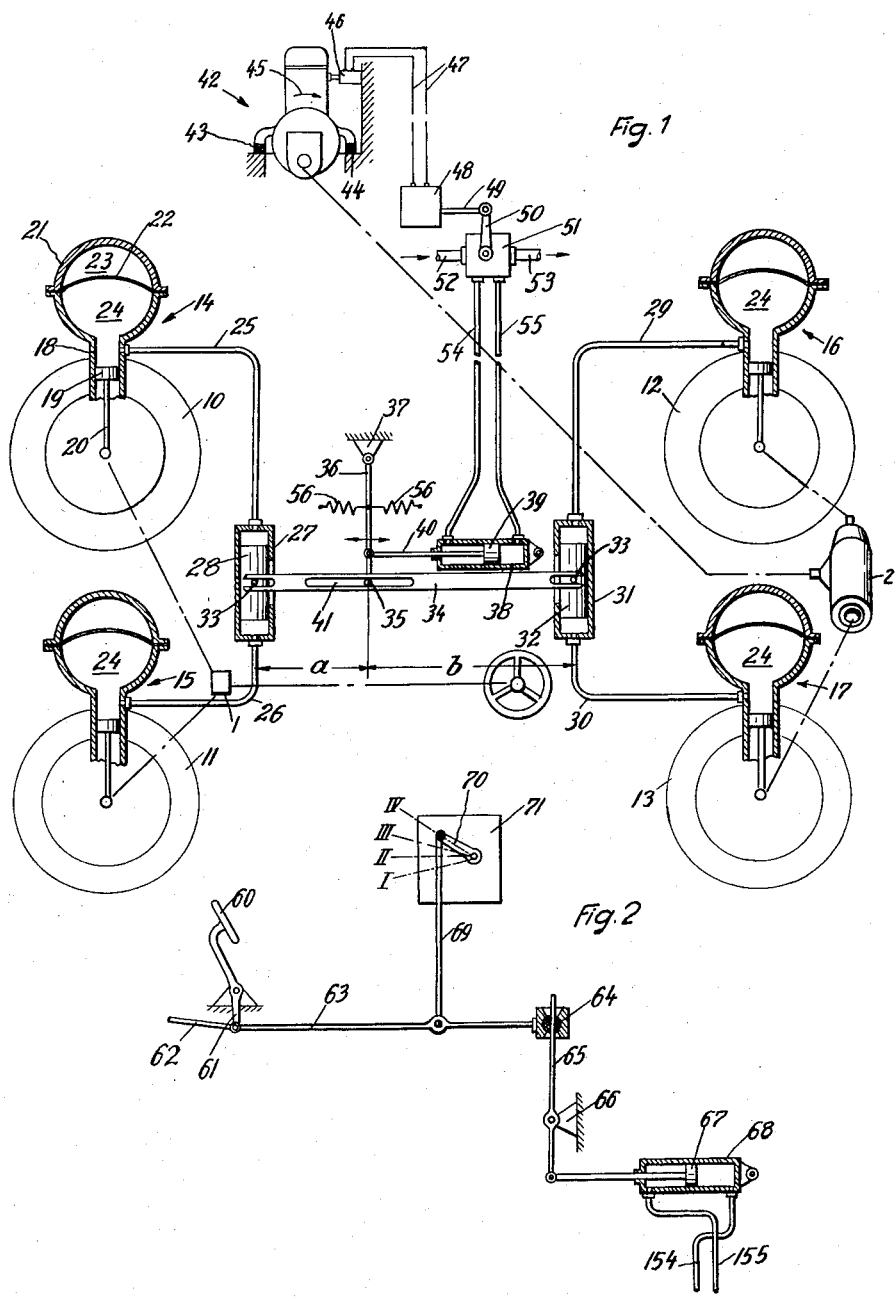

3,016,101
MOTOR VEHICLE EQUIPPED WITH MEANS IMPROVING ITS REACTION TO STEERING OPERATIONS
Ernst J. H. Fiala, Sindelfingen, Kreis Boblingen, Germany, assignor to Daimler-Benz Aktiengesellschaft, Stuttgart-Unterturkheim, Germany
Filed Jan. 9, 1959, Ser. No. 785,928
Claims priority, application Germany Jan. 10, 1958
10 Claims. (Cl. 180—1)

My invention relates to a motor vehicle equipped with means improving its reaction to steering operations.

Some motor vehicles react to a steering operation by "oversteering," i.e. by turning through an angle larger than that theoretically prescribed by a turn of the steering wheel through a certain angle, whereas other vehicles react to such operation by "understeering," i.e. turning through a smaller angle. This attitude depends on a multiplicity of factors including the driving torque transferred to the driven wheels of the vehicle. Owing to the influence of this driving torque, a vehicle in which the rear wheels are driven and which normally tends to understeering will exhibit an oversteering reaction under the influence of a powerful acceleration. The same vehicle will show understeering properties when coasting.

It is the object of my invention to provide a motor vehicle exhibiting an invariable reaction to steering operations.

It is a more specific object of my invention to provide automatically operating means for so controlling the load distribution upon the wheels of a motor vehicle in dependence on the driving torque acting on the rear wheels that the reaction of the vehicle to steering operations will be substantially invariable.

Further objects of my invention will appear from a detailed description of two preferred embodiments thereof described hereinafter with reference to the accompanying drawing. It is to be understood, however, that my invention is in no way restricted to the details of such embodiments but is capable of numerous modifications within the scope of the appended claims and that the terms and phrases used in such detailed description have been chosen for the purpose of explaining the invention rather than that of restricting or limiting the same.

In the drawings:

FIG. 1 is a more or less diagrammatic representation of a control system coordinated to the wheels of a motor vehicle including a torque-responsive device associated with the engine and, FIG. 2 illustrates a control system connected with the accelerator pedal and the transmission-setting lever for the indication of the torque transferred to the driven wheels of the vehicle.

The vehicle is provided with a plurality of wheels 10, 11, 12 and 13 which include a pair of steered wheels and a pair of driven wheels. For example, front wheels 10 and 11 may be steered by a steering mechanism 1, schematically illustrated in FIGURE 1, and rear wheels 12 and 13 may be driven through axle housing means 2, as shown in FIGURE 1.

The load of the body of the vehicle is transfererd to each of the four wheels 10, 11, 12 and 13 by a hydropneumatic spring 14, 15, 16, or 17 respectively, each spring comprising a cylinder 18 mounted on the body of the vehicle and a plunger 19 movably guided therein and connected to the axle of the respective wheel by suitable means diagrammatically indicated as comprising a rod 20. The top of the cylinder 18 communicates with a spherical casing 21 composed of an upper section and a lower section. A diaphragm 22 has its margin clamped between the two sections and divides the interior space of the casing 21 into an upper chamber 23 and a lower chamber 24.

The chamber 23 is filled with a gaseous medium, such as compressed air, whereas the lower chamber 24 and the upper portion of the interior space of the cylinder 18 is filled with a suitable liquid, such as oil. The chambers 24 of the springs 14 and 15 associated with the front wheels 10 and 11 of the vehicle are connected by conduits 25 and 26 to the ends of a cylinder 27 fixed to the body of the vehicle. In this cylinder a piston 28 is movably guided. Similarly, the chambers 24 of the springs 16 and 17 associated with the rear wheels 12 and 13 are connected by pipes 29 and 30 with the ends of a cylinder 31 in which a piston 32 is movably guided. Each piston has a lateral pin 33 which extends through a longitudinal slot of the cylinder 27, or 31 respectively, outwardly and is embraced by the bifurcated end of a two-armed lever 34 fulcrumed about a pivot 35 carried by the end of an arm 36 pivotally mounted on a bracket 37 secured to the body of the vehicle. Suitable adjusting means are associated with the lever 34 for varying the ratio of the lengths of its arms. In the embodiment shown this adjusting means comprises a cylinder 38 mounted on the body of the vehicel so as to extend substantially parallel to the lever 34 and slidably accommodating a piston 39 having a piston rod 40 extending out of the cylinder 38 and being suitably connected with the arm 36, whereby this arm may be swung about its pivot on bracket 37 by displacement of the piston 39 in the cylinder 38. The pin 35 engages a longitudinal slot 41 of the lever 34. Suitable means are provided causing displacement of the piston 39 in its cylinder 38 to a position which at any time is indicative of the driving torque produced by the driving unit 42 and transferred to the rear wheels 12 and 13. In the embodiment shown in FIG. 1 the engine and the transmission constitute a block which is so resiliently mounted in the body of the vehicle by rubber elements 43 and 44 that it will be tilted in the direction indicated by the arrow 45 under the influence of the reaction to the driving torque. The angular displacement of the driving unit 42 is measured by a suitable electrical instrument indicated at 46 which produces an output voltage commensurate with the driving torque transferred to the rear wheels 12 and 13. This output voltage is transferred by electrical conductors 47 to a solenoid 48, the movable core 49 of which is connected to a swingable arm 50 of a rotary control valve 51. This valve is of a type which, depending on the position of the arm 50, establishes a more or less restricted communication of a pressure pipe 52 with one of two pipes 54 and 55, at the same time establishing a more or less restricted communication of the other one of these pipes with an exhaust line 53. The pipes 54 and 55 lead to the ends of the cylinder 38. Suitable means are provided tending to keep the arm 36 in its normal position shown, such as a pair of springs 56 having one end anchored to the body of the vehicle and the other end fixed to the arm 36.

The operation of the control system illustrated in FIG. 1 is as follows: When the veticle is driven through a left-hand curve, the centrifugal force tends to tilt the body of the vehicle towards the right imposing on the springs 14 and 16 a load that is larger than under normal conditions. Similarly, the load imposed on the springs 15 and 17 is smaller than under normal conditions when the vehicle is driven along a straight path. Therefore, the liquid in the spaces 24 of the springs 14 and 15 are subjected to different pressures and, similarly, the liquid in the spaces 24 of the springs 16 and 17 are subjected to different pressures. Owing to these differences of the pressures acting on each piston 28 and 32, both pistons have the tendency to move in a direction towards the pipes 26 and 30. Under this influence the two pistons will move to positions of equilibrium. This is attained when the difference of the pressures prevailing in the pipes 25 and 26 is in the ratio of $b:a$ to the difference of pressures prevailing in the pipes 29 and 30, *b* and *a* being the lengths of the arms of lever 34 determined by the angular position of the arm 36. This ratio *b:a* controls the reaction of the vehicle to steering operations and, in the example under consideration, creates an understeering reaction.

Let it further be assumed that driver now accelerates the vehicle by the transfer of a powerful driving torque to the rear wheels 12 and 13, while driving through the left-hand curve of the road. The increase in driving torque due to the acceleration, transmitted to the roadway, will lessen the tendency of the vehicle to turn reluctantly, in other words, there will arise a tendency toward an excessive turning characteristic. Due to the increase in torque caused by the acceleration, the driving unit 42 will turn in the direction of the arrow 45. This has the effect of tilting the driving unit 42 in the direction of the arrow 45 through a certain angle causing the arm 50 to be turned by the solenoid 48 through a proportional angle. As a result, pipe 55 is connected with the pressure pipe 52 and pipe 54 is connected with the exhaust pipe 53 causing piston 39 to move the arm 36 to the left through a distance proportional to the driving torque. This results in a change of the reaction of the vehicle to the steering operation in such a manner that the understeering tendency of the vehicle is enhanced. By suitably relating the torque to the displacement of the fulcrum 35 of the lever 34 I can insure that the two counteracting tendencies, namely the excessive turning tendency of the driving torque and the reluctant turning tendency due to the shift of the turning point 35, cancel each other out so that the reaction of the vehicle to the steering operation remains invariable.

When the driver releases the accelerator pedal permitting the driving unit 42 to swing back to normal position contrary to the direction indicated by arrow 45, thus terminating the acceleration of the vehicle, the control mechanism including the solenoid 48 and the control valve 51 acts in the opposite way connecting pipe 54 to the pressure pipe 52 and pipe 55 to the exhaust pipe 51, thus permitting lever 36 to return to its normal position.

From the above it will be understood that displacement of piston 28 towards the pipe 25 results in a depression of the piston 19 and in a corresponding ascent of the piston of spring 15, whereby the load carried by wheel 10 is increased and the load carried by the wheel 11 is decreased a corresponding amount. Hence, the piston 28 associated with the front wheels 10 and 11 of the vehicle constitutes a means for modifying the difference of the load imposed upon one of the front wheels from the load imposed upon the other one of the front wheels. Similarly, the piston 32 constitutes a means associated with the rear wheels 12 and 13 for modifying the difference of the load imposed upon one of the rear wheels from the load imposed upon the other one of the rear wheels. The control mechanism including the measuring instrument 46, the solenoid 48, the control valve 51, the cylinder 38, the piston 39, and the arm 36 constitutes a device for indicating the driving torque transferred from the driving unit 42 to the driven pair of wheels 12 and 13. The two-armed lever 34 constitutes a mechanism operable by the torque indicating device and connected with the pistons 28 and 32 for actuation thereof to control the ratio of the above-mentioned load differences in dependence on the driving torque.

In the embodiment of my invention illustrated in FIG. 2 the device for indicating the driving torque is associated with the accelerator pedal and with the setting means for determining the ratio of transmission of the driving torque from the engine to the rear wheels 12 and 13. For this purpose, the arm 61 of the accelerator pedal 60 connected by a rod 62 with the throttle valve of the carburetor is pivotally connected to one end of an arm 63, the other end of which carries a rotatably mounted spherical bearing 64 in which the upper arm of a two-armed lever 65 is slidably mounted. This lever is fulcrumed on a bracket 66 fixed to the body of the vehicle. The shorter arm of the lever 65 is pivotally connected to the piston rod of a piston 67 movable in a cylinder 68 attached to the body of the vehicle. The ends of this cylinder communicate with pipes 154 and 155 which correspond to pipes 54 and 55 of FIG. 1 and lead to the cylinder 38.

The arm 63 is pivotally connected between its ends with one end of a link 69 having its other end pivotally connected to an arm 70 which is mounted on the transmission 71 and serves to set this transmission to various ratios determining the torque transferred to the wheels 12 and 13. The various angular positions of the setting arm 70 are indicated by I, II, III and IV.

The operation is as follows:

When the driver depresses the accelerator pedal 60 to accelerate the vehicle while driving through a curve, the arm 63 is pushed towards the lever 65, whereby this lever is swung in clockwise direction pulling the piston 67 towards the left, thus feeding liquid into the pipe 155 and sucking liquid out of the pipe 154. This causes displacement of piston 39 to the left. In FIG. 2 the arm 63 assumes the position for the fourth speed. For lower speeds the same position of the accelerator pedal 60 results in a higher driving torque transmitted to the wheels 12 and 13 requiring a larger displacement of the piston 67. This larger displacement is attained by adjustment of the bearing 64 towards the bracket 66 causing a certain stroke imparted to the arm 63 to result in a larger displacement of the piston 67. Therefore, the position of the piston 67 is indicative of the driving torque transferred to the rear wheels 12 and 13.

From the above it will appear that I have provided a system for so controlling the ratio of the difference of the front wheel loads to the difference of the rear wheel loads in dependence on the driving torque transferred to the rear wheels as to insure that the reaction of the vehicle to steering operations will remain invariable. This is due to the face that this ratio controls the understeering or oversteering reactions of the vehicle. If the difference of the rear wheel loads is larger than the difference of the front wheel loads, the vehicle tends to oversteering. If, however, the difference of the rear wheel loads is smaller than the difference of the front wheel loads, the vehicle tends to display understeering reactions. Therefore, I am able by controlling this ratio to compensate the influence of changes of the driving torque upon the reaction of the vehicle to steering operations.

While the invention has been described in connection with two preferred embodiments thereof, it will be understood that it is capable of further modification, and this application is intended to cover any variations, uses, or adaptations of the invention following, in general, the principles of the invention and including such departures from the present disclosures as come within known or customary practice in the art to which the invention pertains, and as fall within the scope of the invention or the limits of the appended claims.

What I claim is:

1. In a motor vehicle having an engine, a pair of front wheels and a pair of rear wheels, at least one of said pairs being driven by said engine, the combination comprising means operative connected with the front wheels of the vehicle for modifying the difference of the load imposed upon one of said front wheels from the load imposed upon the other one of said front wheels, means operatively connected with the rear wheels for modifying the difference of the load imposed upon one of said rear wheels from the load imposed upon the other one of said rear wheels, a device for indicating the driving torque transferred from said engine to said driven pair of wheels, and a mechanism operable by said device and connected with both said means for actuation thereof to control the ratio of said differences in response to said driving torque.

2. The combination claimed in claim 1 in which said device for indicating the driving torque is operatively connected with said engine and movable in response to the torque produced by said engine.

3. The combination claimed in claim 1, in which said engine is operatively connected to and controlled by an accelerator pedal and in which said device for indicating the driving torque is operatively connected with said accelerator pedal and movable in response to the actuation thereof.

4. A motor vehicle having an engine as claimed in claim 1 including, an accelerator pedal for controlling said engine, a transmission for transferring the torque produced by said engine to the driven wheels of said vehicle, setting means for changing the ratio of said transmission, and in which said device for indicating the driving torque is operatively connected with said accelerator pedal and said setting means to be movable in response to the position thereof.

5. In a motor vehicle having an engine, a pair of front wheels and a pair of rear wheels, at least one of said pairs being connected with said engine to be driven thereby, the combination comprising pressure producing means operatively connected with each of said wheels for producing fluid pressure proportional to the load imposed upon said wheel, a first piston, a first cylinder accommodating said piston, means connecting the ends of said cylinder to said pressure producing means operatively connected with said front wheels to subject the opposite faces of said first piston to fluid pressures commensurate with the loads imposed on said front wheels, a second piston, a cylinder accommodating said second piston and connected with said pressure producing means operatively connected with said rear wheels to subject opposite faces of said second piston to fluid pressures commensurate with the loads imposed upon said rear wheels, a two-armed lever fulcrumed about a pivot carried by said vehicle and having its one arm connected to said first piston and its other arm connected to said second piston, adjusting means operatively connected with said lever for varying the ratio of the lengths of its arms, torque indicating means movable to positions representative of the driving torque transferred from said engine to said driven wheels, and means connecting said torque indicating means with said adjusting means to vary the ratio of said arms of said lever in response to said torque.

6. The combination claimed in claim 5 in which said torque indicating means is operatively connected with said engine and movable in response to the torque produced thereby.

7. A motor vehicle as claimed in claim 5, wherein said adjusting means includes a piston, a cylinder accommodating said piston, means connecting each end of said cylinder to a pressure source and an exhaust, and means controlling said connecting means to vary the pressure on each side of said piston, and wherein said torque indicating means is operatively connected to said controlling means to control said means in response to the driving torque.

8. In a motor vehicle having an engine, a pair of front wheels and a pair of rear wheels, at least one of said pairs being driven by said engine, first means operatively connected with said front wheels for modifying the difference between the load imposed on one of said front wheels and the other of said front wheels, second means operatively connected with said rear wheels for modifying the difference between the load imposed on one of said rear wheels and the other of said rear wheels, a device for measuring the driving torque transferred from said engine to said driven pair of wheels, and a mechanism operatively connected to said first and second means for controlling the ratio of said differences, said mechanism being operated by said device in response to said driving torque.

9. A motor vehicle claimed in claim 8, wherein each of said first and second means includes pressure producing means attached to each of the wheels thereof and a piston connected between said pressure-producing means, and wherein said mechanism comprises a two-armed lever fulcrumed about a point and connected at each of its ends to one of said pistons, and means for varying said pivot point to vary the ratio of the length of said arms connected to said pistons, and wherein said device is operatively connected to said means for varying the ratio of the length of said arms to control the ratio of said lengths in response to the driving torque.

10. In a motor vehicle having an engine, a pair of front wheels, a pair of rear wheels, and a steering mechanism, at least one of said pairs of wheels being driven by said engine and one being steered by said mechanism, the improvement comprising, means for controlling the load distribution upon said wheels in dependence on the driving torque transferred from said engine to said pair of driven wheels so that the reaction of the vehicle to steering operations will be substantially invariable including means operatively connected with the front wheels of the vehicle for modifying the difference of the load imposed upon one of said front wheels from the load imposed upon the other one of said front wheels, means operatively connected with the rear wheels for modifying the difference of the load imposed upon one of said rear operatively connected with the rear wheels for modifying the difference of the load imposed upon one of said rear wheels from the load imposed upon the other one of said rear wheels, means for indicating the driving torque transferred from said engine to said driven pair of wheels, and means operable by said indicating means and connected with said means operatively associated with said front wheels and with said means operatively associated with said rear wheels for actuation thereof to control the ratio of said differences in response to said driving torque.

References Cited in the file of this patent

UNITED STATES PATENTS

| | | |
|---|---|---|
| 2,181,161 | Wolf | Nov. 28, 1939 |
| 2,788,985 | Girton | Apr. 16, 1957 |
| 2,804,311 | Pobanz | Aug. 27, 1957 |
| 2,828,138 | Brueder | Mar. 25, 1958 |